United States Patent [19]

Trucks

[11] Patent Number: 4,896,011
[45] Date of Patent: Jan. 23, 1990

[54] MICROWAVE POTATO BAKING STAND AND METHOD FOR BAKING POTATOES

[76] Inventor: Joe Trucks, 143 Twin River Rd., P.O. Box 321, Eureka, Mo. 63025

[21] Appl. No.: 328,184

[22] Filed: Mar. 24, 1989

[51] Int. Cl.⁴ .............................................. H05B 6/80
[52] U.S. Cl. ...................... 219/10.55 E; 219/10.55 M; 99/419; 99/DIG. 14; 426/243
[58] Field of Search ................ 219/10.55 E, 10.55 R, 219/10.55 F, 10.55 M; 99/419, DIG. 14; 426/243, 241, 466, 523; 116/215, 209, DIG. 1

[56] References Cited

U.S. PATENT DOCUMENTS

| | | | |
|---|---|---|---|
| 931,587 | 8/1909 | Fairbanks | 99/419 |
| 1,308,253 | 7/1919 | Oftedahl | 99/419 |
| 1,630,188 | 5/1927 | Knauff | 99/419 |
| 1,755,646 | 4/1930 | Halstead | 99/419 |
| 1,890,907 | 12/1932 | Hoover | 99/419 |
| 1,969,601 | 8/1934 | Foch | 99/419 |
| 2,111,456 | 3/1938 | Markle, Jr. | 99/419 |
| 2,821,904 | 2/1958 | Arcabosso | 99/419 |
| 3,379,118 | 4/1968 | Perez | 99/419 |
| 4,294,168 | 10/1981 | Redhead | 99/419 |
| 4,558,197 | 12/1985 | Wyatt | 219/10.55 E |

Primary Examiner—Philip H. Leung
Attorney, Agent, or Firm—Robbins & Robbins

[57] ABSTRACT

A microwave potato baking stand and method for baking potatoes is provided. The stand consists of an upstanding spike supported by a base. A potato is impaled on the spike substantially towards the tip, whereby it may efficiently receive microwave energy and provide a more thorough cooking. As the pulp of the potato softens to the desired consistency from cooking, the potato slides down the spike to indicate a fully cooked potato. The stand may be modified to provide additional visual cues, such as a trigger released indicator arm.

9 Claims, 1 Drawing Sheet

MICROWAVE POTATO BAKING STAND AND METHOD FOR BAKING POTATOES

BACKGROUND OF THE INVENTION

The present invention relates to a product and method for baking potatoes in a microwave oven.

It has long been a problem to accurately determine when a potato is sufficiently baked. It is especially difficult while cooking with a microwave because the skin of the potato will not get as crisp as with a conventional oven, therefore making mere sight determinations impractical, if not impossible. One generally has to temporarily stop the microwave, feel the potato and then rotate it so that other parts of the surface of the potato receive adequate exposure to the microwave energy. These steps may have to be repeated several times until the potato is satisfactorily cooked, i.e., when the meat or pulp of the potato is softened. This is an inefficient method by which to bake potatoes by microwave. The problem with baking potatoes by microwave oven, therefore, are (1) that potatoes, being of substantial mass, cannot be evenly cooked because a large portion of the surface area is shielded from the microwaves as it lies on the cooking tray in the oven; and (2) that visual inspection of determining when the potato is cooked is impossible.

Cookware exists which enables potatoes to be positioned in such a way that they may be efficiently baked in a microwave oven. This may be done by suspending the potato on upright teeth or blades so that the potato does not rest on the cooking tray. This allows the potato to receive cooking heat to its entire surface area. The problem still exists, however, in determining when the potato has finished cooking.

Accordingly, there is a distinct need for a device which would enable one to efficiently cook a potato in a microwave oven, while making it possible to provide an indication that the potato has finished cooking.

SUMMARY OF THE INVENTION

By means of the instant invention there has been provided a device and method by which a potato may be efficiently cooked in a microwave oven, and at the same time providing means for indicating when the potato has finished cooking.

The device is comprised of a circular base having an upstanding spike. A potato is impaled on the spike down to a predetermined mark so that the potato is suspended above the surface of the cooking tray in the microwave oven. As cooking proceeds, the meat of the potato will soften to the desired consistency. Once this happens, the weight of the potato will cause it to slide down the spike, indicating that cooking is complete.

The potato baking stand of the instant invention may also have means for visually signalling to the user that the potato is done, comprising an indicator sign, or flap, pivotally triggered by a trip arm. As the potato descends down the spike, it comes into contact with the trip arm, thereby pivoting the indicator flap into a visual position.

It is, therefore, an object of this invention to provide a method whereby a potato may be efficiently and completely cooked in a microwave oven.

It is further an object of this invention to provide a simple device for efficiently cooking a potato in a microwave oven using an upstanding spike supported by a base, whereby the potato is initially impaled upon the spike and descends down the spike as cooking is completed.

It is yet further an object of this invention to provide a device for efficiently cooking a potato in a microwave oven with means provided for visually indicating to the user that cooking is completed.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
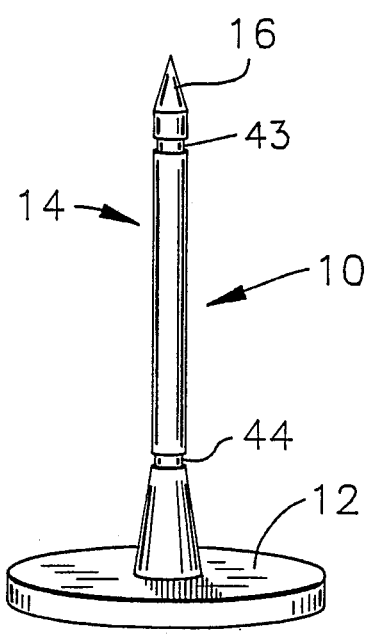
FIG. 1 is a pictorial view of the potato baking stand.

The microwave potato baking stand of this invention is generally indicated by the numeral 10 as shown in FIG. 1. It is comprised of a base 12 and a spike 14. The spike 14 is connected to the base 12 and rises vertically therefrom. The spike has a pointed end 16 upon which the potato is impaled. The materials for the components of the baking stand may be any that are microwave-safe, such as wood, plastic or ceramic.

Figure 2:
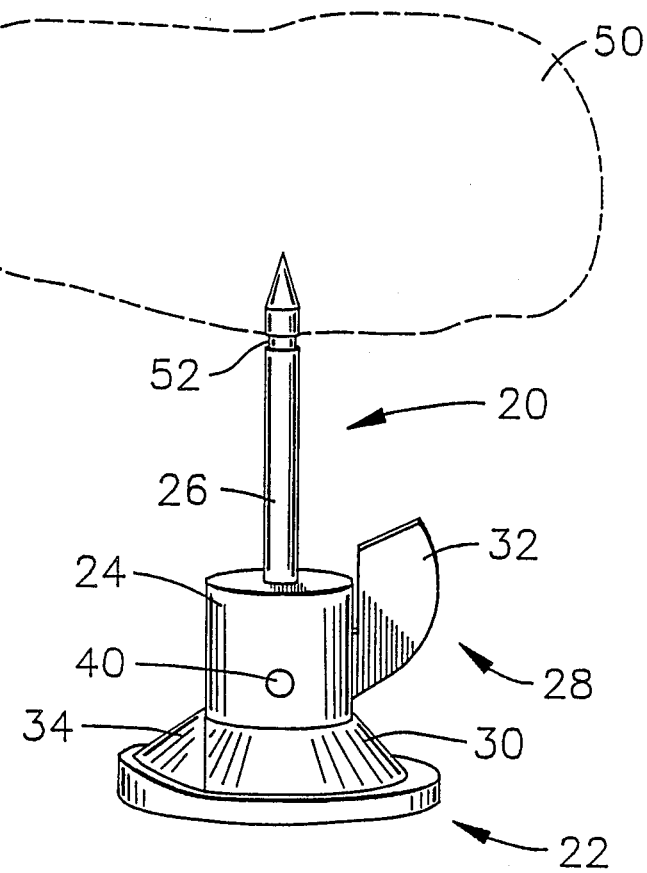
FIG. 2 is a pictorial view of a modified potato baking stand with a potato impaled thereon.
Figure 3:
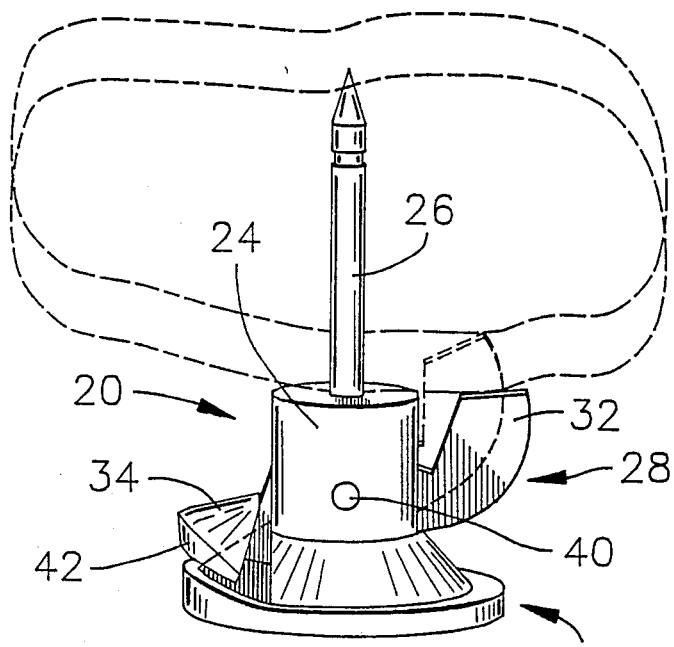
FIG. 3 is a pictorial view of the modified potato stand showing the descending potato coming into contact and tripping the indicator arm.
Figure 4:
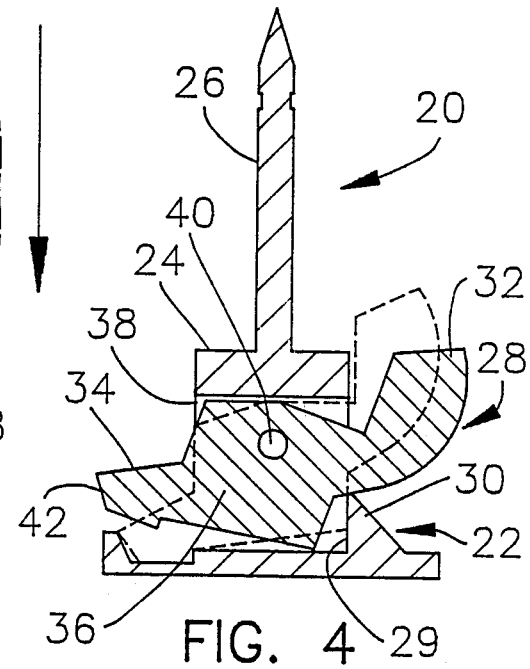
FIG. 4 is a sectional view in side elevation of the modified potato stand taken along the upright longitudinal axis.

FIGS. 2-4 show a modified version of the potato baking stand which is given the reference numeral 20. It is comprised of a base 22, a pedestal 24, spike 26, and indicator arm 28. Spike 26 rises vertically from the pedestal 24. The spike may be integral with the pedestal or may be connected to the pedestal by conventional means such as gluing. In the embodiment shown, pedestal 24 is received in base 22 in a frictional engagement in a recess 29 formed within the frustoconical shaped top 30 of the base 22 as best shown in FIG. 4.

Indicator arm 28 is comprised of a trigger 32 and indicator flap 34 at opposite ends. The center portion 36 of indicator arm 28 is received within a slot 38 of pedestal 24 as best shown in the sectional view of FIG. 4. The indicator arm 28 is pivotally moveable about pivot pin 40. Trigger 32 is disposed upward so that it extends above the top of pedestal 24. Indicator flap 34 is disposed downward so that its top surface lies flush with the frustoconical top 30 of the base 22. The top of the base 30 is constructed so that the walls do not extend entirely circumferentially. A gap is left to accommodate flap 34 so that it may lie flush with the top 30 in the inactive position shown in FIG. 2. Indicator arm 28 may be comprised of the same material as the rest of the potato baking stand, or may be made of any material that is microwave safe.

USE

The potato baking stand is very simply employed in microwave ovens as well as conventional ovens. Using the simple baking stand of FIG. 1 a potato is impaled on pointed end 16 down to an annular starting mark 43 placed on the spike 14. In order that the potato may be properly vented during cooking, it is advisable to puncture the potato with a fork or the like. Because the potato is suspended over the bottom of the oven, the entire surface of the potato receives the microwave radiation, resulting in more efficient baking. As the potato cooks, the pulp softens and the weight of the potato causes it to slide down the spike. The pulp will be of the desired consistency for eating. An annular mark 44 denoting the 'finish' line may be placed toward the bottom of spike 14. The annular marks 43 and 44 may be comprised of indentations, lines flush with the surface of the spike, or raised markings.

In the modified stand of FIGS. 2-4, a potato 50 is impaled on spike 26 down to the annular mark 52. As cooking is completed, the potato slides down the spike and comes into contact with trigger 32 of the indicator arm as best shown in the broken line drawing in FIG. 3. The weight of the potato depresses trigger 32 of the indicator arm 28 which pivots about pin 40. Indicator flap 34 is simultaneously raised which provides an additional visual cue that cooking is complete. Appropriate markings or wording as a signal may be placed on the front edge 42 of indicator flap 34 which would be exposed when the trigger 32 is depressed. Indicator flap 34 falls by its own weight to lie flush with the frustoconical top 30 when trigger 32 is released to its resting position as shown in FIG. 4.

Various changes and modifications may be made within this invention as will be apparent to those skilled in the art. Such changes and modifications are within the scope and teaching of this invention as defined in the claims appended hereto.

What is claimed is:

1. A device for baking potatoes in an oven, comprising a base and a spike, said spike being attached at one end to said base, an other end of said spike rising vertically from said base, and said other end of said spike being pointed whereupon a potato may be impaled, and said spike having an annular mark substantially near said other end of said spike to provide a guideline for the placement of said potato upon impalement, whereby as baking proceeds said potato may slide down said spike by its own weight when said potato has reached the desired consistency.

2. The device according to claim 1 in which said spike has a second annular mark substantially near said first end of said spike to provide a guideline to which said potato descends to indicate that said potato has finished cooking.

3. A device for baking potatoes, especially for use in a microwave oven, comprising a base, a pedestal, a spike, and an indicator arm, said pedestal being attached to said base, said spike being attached at one end to a top of said pedestal, an other end of said spike rising vertically from said pedestal, said other end of said spike being pointed whereupon a potato may be impaled, and said indicator arm being pivotally attached to said device in a downward path of said potato whereby said indicator arm will pivot downward upon contact with said potato as it descends during cooking, providing a visual cue to indicate that said potato is cooked.

4. The device according to claim 3 in which said spike has an annular mark substantially near said other end of said spike to provide a guideline for the placement of the potato upon impalement.

5. The device according to claim 3 in which said indicator arm is pivotally receivable in a slot in said pedestal, said pedestal and said indicator arm having registering holes for alignment in said slot whereby they may be connected by a pivot pin, said indicator arm having a trigger and a flap at opposite ends, said trigger rising above said pedestal, whereby when trigger is depressed by said descending potato said flap is pivotally raised upward as a signal.

6. A method of baking potatoes in a microwave oven, which comprises supporting a spike vertically in said oven, impaling a potato on said spike to a position on a mark substantially near the top of said spike, and cooking said potato for an effective amount of time, whereby the pulp of said potato becomes soft, allowing said potato to slide down from said position on said spike as thoroughly cooked.

7. The method according to claim 6 in which said spike is connected to a base, said base supporting said spike in said oven in a free standing position.

8. The method according to claim 6 in which said potato triggers a signal on said spike as said potato descends to a predetermined location on said spike to indicate that said potato is thoroughly cooked.

9. The method according to claim 8 in which said signal is a visual cue, said visual cue being a trigger released indicator arm.

* * * * *